3,697,374
GRADIENT-TYPE NUCLEAR FUEL PLATE
Rodney W. Knight, Melvin M. Martin, and William R. Martin, Oak Ridge, Tenn., assignors to the United States of America as represented by the United States Atomic Energy Commission
Filed Nov. 3, 1970, Ser. No. 86,576
Int. Cl. G21c 3/20
U.S. Cl. 176—69                 5 Claims

ABSTRACT OF THE DISCLOSURE

Gradient-type nuclear fuel plates exhibiting minimal blister formation are provided by introducing an inert ceramic dispersoid into the filler material of the fuel plate, said dispersoid providing a void volume of between about 2–4 volume percent in said filler material. In one embodiment a gradient-type nuclear fuel plate comprising an aluminum-base dispersion fuel clad with aluminum metal is prepared wherein the dispersoid is alpha-phase $Al_2O_3$.

BACKGROUND OF THE INVENTION

The invention herein was made in the course of, or under, a contract with the United States Atomic Energy Commission. It relates generally to dispersion-type nuclear reactor fuel plates and more particularly to an improved gradient-type nuclear fuel plate composition which exhibits minimal blister formation and to a method for making same.

Plate-type fuel elements and their fabrication method are well known in the art. In U.S. Pat. 3,175,955, issued on Mar. 30, 1965, to Richard D. Cheverton for "Gradient Fuel Plates" there is provided an embodiment of an involute plate-type fuel element for use in a high flux reactor comprising a primary fuel core which varies in thickness inversely with the neutron flux across its width, a secondary core (of filler material with or without burnable poison) which consists of wedge-shaped aluminum inserts bonded to the primary core and which varies in thickness so that the composite core (i.e., primary plus secondary) is of a uniform thickness across the plate and an outer aluminum metal cladding which surrounds and is bonded to the composite core. Fabrication of this type fuel plate was initially carried out by separately cold pressing a metal powder or metal-ceramic powder for each component of the primary core fuel and secondary core and hot forging each of the resulting metal or cermet pieces of rectangular cross section into the desired configuration; the composite core was then placed in a "picture frame" sandwiched between two plates of cladding metal and the assembly reduced in thickness and a metallurgical bond achieved by hot rolling at an elevated temperature. The resultant plate was trimmed to a specified size and given a desired curvature. This method had certain problems associated with it; namely, blistering of the cladding caused by trapped lubricant and occluded air.

In U.S. Pat. 3,198,856, issued on Aug. 3, 1965, to Joseph P. Hammond et al. for "Method of Fabricating a Composite Nuclear Fuel Core Element" there was described an improved method for fabricating gradient-type fuel elements. The composite core is fabricated from metal fuel powder and metal filler powder in a single pressing into an integral core. While this method reduced blisters on the core side of the fuel plates during fabrication, we have found that blisters still are formed on the filler side of the fuel plate. Various treatments of the fuel plates, such an vacuum outgassing of the composite core at high temperatures, have been tried to eliminate blister formation. Heretofore, about 5% of the fuel plates are rejected at final inspection for some non-uniformity and most (about 4% of the plates) of the rejections are due to blisters occurring on the filler side of the plates.

It is desirable and an object of our invention to provide a gradient-type nuclear fuel plate composition which minimizes blister formation and a method of making same.

SUMMARY OF THE INVENTION

This object has been achieved by our discovery that incorporating an amount of an inert ceramic dispersoid into the filler portion of the composite core avoids the formation of blisters on the filler side of the fuel plate during subsequent fuel fabrication. We have found that concentrations of this dispersoid in a weight percent up to 50% provides a void volume in the filler material of 2–4 volume percent which is essential to the formation of our blister-free fuel plates. Seventy-two, full-sized dummy fuel plates consisting of an aluminum-base dispersion fuel clad with Type 6061 aluminum alloy and containing 17.2 weight percent of alpha-phase $Al_2O_3$ were fabricated and whereas a rejection rate of about 38% would have been expected based on prior experience, none were rejected because of blisters.

DESCRIPTION OF THE PREFERRED EMBODIMENT

Figure 1:
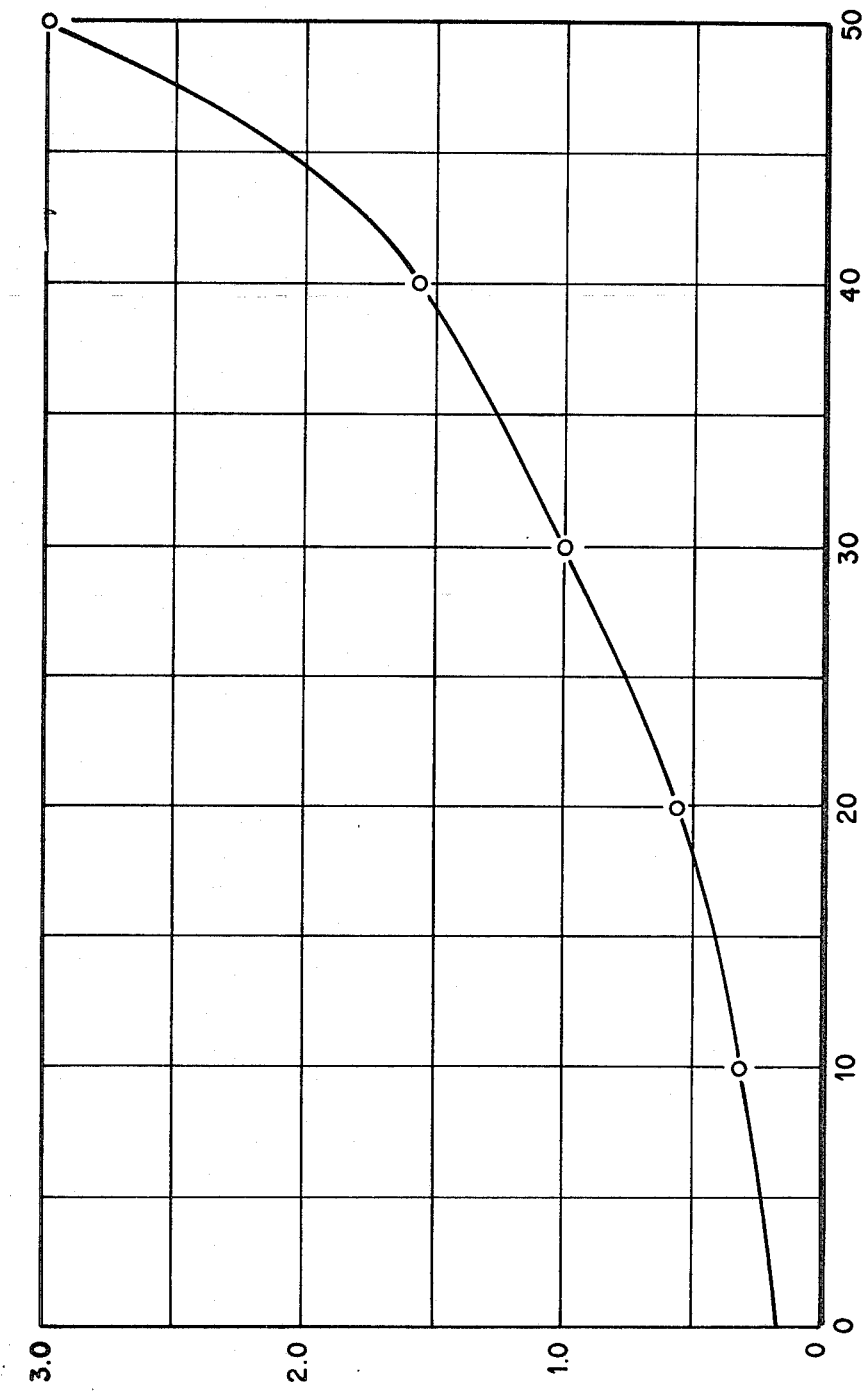
FIG. 1 is a plot showing the quantity of voids (volume percent) in the fuel plates as a function of zirconia as a dispersoid.

Our invention is broadly applicable to providing improvements in the formation of blister-free gradient-type nuclear fuel plates of any of the well known types provided in the art. For example, in the method described in the Hammond et al. patent our improvement is achieved by simply incorporating an amount of inert ceramic dispersoid into the filler material prior to cold pressing of the fuel composite to provide an increased void volume which is between about 2–4 volume percent of the filler material. Accordingly, our modified composition is achieved by charging a first metal powder blend consisting of 101 aluminum particles and high-fired $U_3O_8$ particles of 92% enrichment in U–235 in a die assembly. The powder blend is then shaped to a desired fuel contour. A second metal powder blend, as a filler, consisting of 101 aluminum particles and an inert ceramic powder, such as $Al_2O_3$, is placed upon top of the fuel powder blend. The 101 aluminum in this second blend is in the vacuum annealed condition and consists of only —100 mesh powder with at least 75 weight percent —325 mesh powder. Using an inert ceramic such as $Al_2O_3$, the size thereof is —180 mesh. For the inner annulus of a standard HFIR plate, 17.2 weight percent $Al_2O_3$ is blended with 82.8 weight percent 101 aluminum powder. The top of the powder in the die is then leveled and the composite is cold pressed. The fuel composite is then encased in a suitable cladding material and rolled to a desired thickness, trimmed to size and formed into the involute geometries for the fuel plates.

The nuclear fuel material may comprise any actinide metal compound, such as the oxides, carbides, nitrides, etc., of thorium, uranium and plutonium and mixtures thereof. The filler material may comprise aluminum or other metal forming a good bond with a cladding material. A burnable neutron poison, such as cadmium or $B_4C$, may be incorporated in the filler material.

Any inert ceramic material which is capable of being crushed into powder and which is compatible with aluminum (or other filler material) may be utilized as our dispersoid. It goes without saying that further limitations should be considered in regard to minimizing deleterious effects on the reactor operation, i.e., the material should have a minimal influence on flux. It is also desirable that the dispersoid have no effect on the thermal conductivity of the fuel compact. Non-limiting examples of suitable dispersoids are $ZrO_2$, $Al_2O_3$, BeO, MgO, and $SiO_2$. While $ZrO_2$ is a suitable dispersoid, care must be taken to avoid the presence of hafnium contamination found in the $ZrO_2$ which would render it questionable from the nuclear standpoint. Of the mentioned dispersoids, $Al_2O_3$, such as alpha-phase $Al_2O_3$, is the preferred inert ceramic material.

The dispersoid should be incorporated in sufficient amounts to provide between 2–4 volume percent voids in the filler material. Where the dispersoid is provided in an amount that the void volume is significantly below 2%, there will be insufficient void volume available to eliminate blistering. Where, on the other hand, the concentration of the dispersoid is such that the void volume percent in the filler is above 4% no further benefit toward blister elimination is gained and reduced thermal conductivity will result.

Referring to FIG. 1, the quantity of voids in the filler portion of the fuel plates is shown to increase exponentially from 0.3 volume percent for a 10 weight percent zirconia dispersion to 3.0 volume percent for a 50 weight percent zirconia dispersion.

Figure 2:
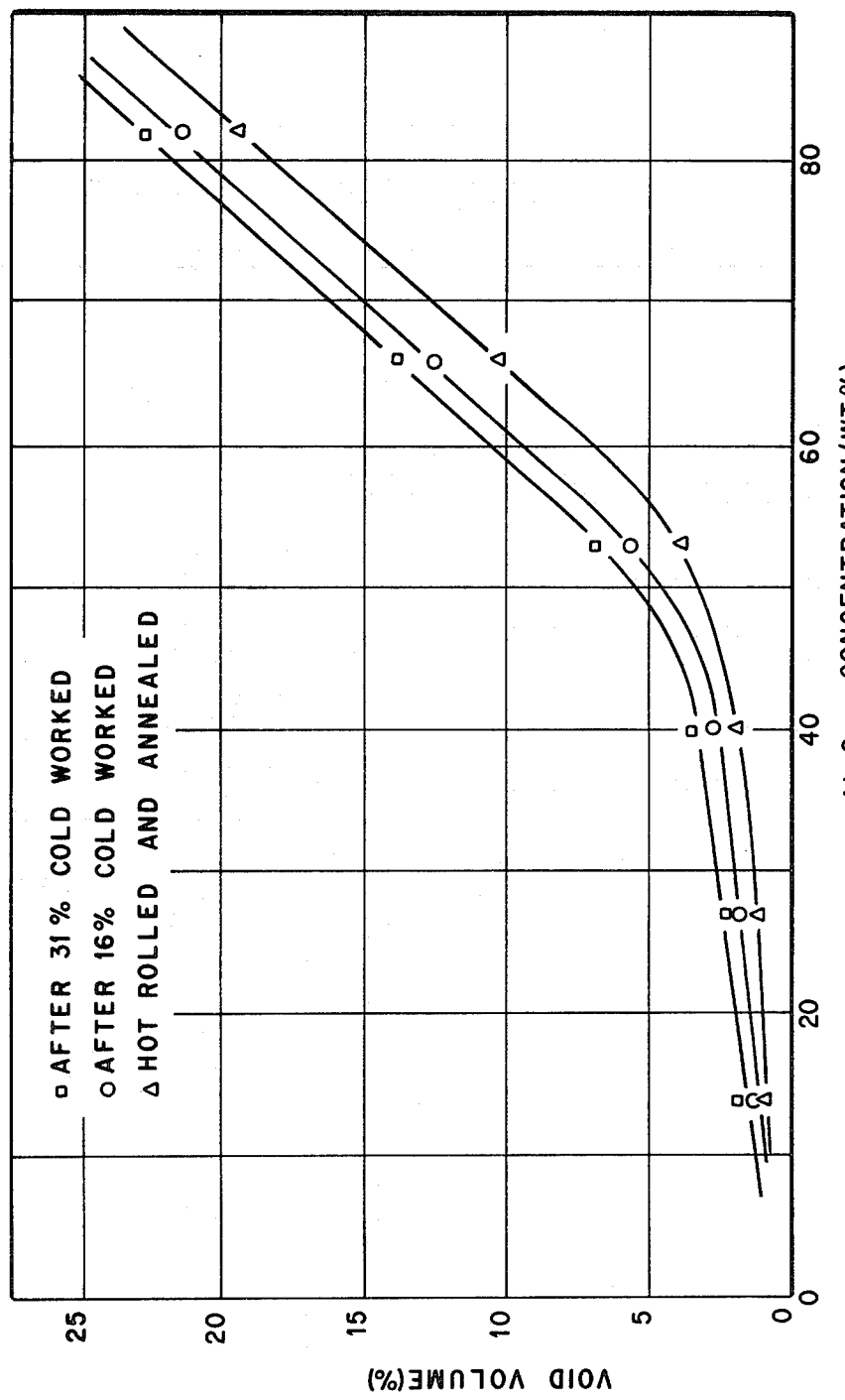
FIG. 2 is a plot showing the quantity of voids (volume percent) in fuel plates as a function of $\alpha$-alumina as a dispersoid (weight percent), and the relationship of cold working upon the void volume.

FIG. 2 shows that the quantity of voids in the filler portion of the fuel plates increases from less than 1 volume percent for 14 weight percent of alumina dispersion to about 20 volume percent for a filler portion containing 82 weight percent $Al_2O_3$.

Having described the invention in a general fashion the following examples are given to more carefully detail our improved fuel composition as achieved in preparing gradient-type nuclear fuel plates.

EXAMPLE 1

Sample (miniature) plates were fabricated, to simulate the filler portion of a composite fuel plate, with and without $ZrO_2$ added to the conventional filler material. Powder blends of 10, 20, 30, 40 and 50 weight percent $ZrO_2$ (5.564 g./cm.$^3$, chemical analysis —70 weight percent Zr) with 101 aluminum powder (75 weight percent —100 +325 mesh and 25 weight percent —325 mesh) were prepared. These blends were charged into a die assembly and pressed at 30 t.s.i. into cold pressed compacts. The compacts were sintered for 1 hour at 500° C. at a pressure of less than 0.05 torr. The compacts were encased in a 6061 aluminum frame and cladding and hot rolled at 500° C. to a total reduction of 8:1.

The samples which did not contain any $ZrO_2$ showed a significant portion of blister formation on the filler side as previously experienced in manufacturing process of gradient-type fuel plates. In marked contrast, no blistering was observed when zirconia was present in the filler material concentration up to 50 weight percent (3% void volume).

EXAMPLE II

Full-sized dummy fuel plates, with a core dimension of 2½ in. wide, 20 in. long and 0.030 in. thick, were prepared with dispersion based fuel as follows. A fuel blend of 101 powder and high-fired $U_3O_8$ powder was prepared. The 101 powder size was 75 weight percent —325 mesh and 25 weight percent +325 —100 mesh. The fuel powder size was 95 weight percent +325 —100 mesh and 5 weight percent —325 mesh. This fuel blend was charged into a die and the surface shaped to the contour to produce the desired fuel depth gradient. A second blend consisting of 101 aluminum powder and 17.2 weight percent $Al_2O_3$ was prepared. The size of the aluminum powder was the same as used in the fuel blend, and the alumina particle size was 25 weight percent —140 +170 mesh, 25 weight percent —170 +200 mesh, 25 weight percent —200 +230 mesh and 25 weight percent —230 mesh. This filler blend was placed on top of the fuel blend in the die and was leveled. The total powder charge was cold-pressed into a compact, encased in an aluminum cladding and rolled and sized to produce a plate of conventional HFIR configuration. The void volume was then measured using conventional immersion density techniques. The void volume in the filler material was increased about 2% by this volume of dispersoid, e.g., to about 3% from an original 1% value. These plates were then treated as standard fuel plates having 7.6/1 hot reduction followed by 20% cold work. Manufacture was carried to finished fuel plates and inspection included those for blisters, surface damage and ultrasound testing.

Previously, fuel plates prepared in accordance with this general method resulted in a rejection rate of about 38%. Of the 72 dummy plates, however, none were rejected because of blister formation. It may thus be seen that the incorporation of the inert ceramic dispersoid $Al_2O_3$ in an amount which will provide a total void volume of about 3% in the filler material resulted in no blister formation on the filler side of the plates.

EXAMPLE III

Sample (miniature) plates were prepared using a compact of $U_3O_8$ in aluminum and alpha-phase $Al_2O_3$ in aluminum, the compacts being clad with Type 6061 aluminum alloy. The method of compact forming was the same as in Example II. Clad compacts were hot rolled (total 7.6:1 reduction ratio) into plates by conventional techniques. After annealing the hot rolled plates for 1 hour at 500° C. the plates were then rolled at room temperature to reductions of 8, 16, and 31%. The resulting plates were annealed for three hours at 490° C. and then slowly cooled to produce zero temper condition in the 6061 Al cladding.

The void content was determined before cold rolling and thereafter at 8, 16, and 31% reduction as well as after the final annealing. The data which is given as pre-cold rolling vs. a reduction of 16% and 31% is plotted in FIG. 2. The final anneal had little effect upon the void content and thus the curve for 31% reduction adequately represents the final annealed condition.

While our invention has been described in terms of an improved gradient-type fuel plate, it is equally applicable to any composite core fuel element wherein separate but juxtaposed or overlapping fuel and filler portions are utilized within the encasing cladding material.

What is claimed is:

1. A nuclear fuel plate comprising a comopsite core encased in a protective cladding, said composite core comprising a fuel portion and an overlying filler portion positioned between said fuel portion and said cladding, said filler portion comprising a metal powder blend and an inert ceramic dispersoid and wherein said dispersoid is present in an amount of from 15 to 50 weight percent of said filler portion and said filler portion has a void volume of between about 2–4 volume percent to thereby minimize blister formation between said filler portion and said protective cladding.

2. The fuel plate of claim 1 wherein said inert dispersoid is selected from the group consisting of $ZrO_2$, BeO, MgO, $SiO_2$ and $Al_2O_3$.

3. The fuel plate of claim 1 wherein said fuel portion comprises an aluminum-base dispersion fuel having a fuel depth gradient, said filler portion comprises a mixture of aluminum together with said dispersoid, and said protective cladding is aluminum metal.

4. The fuel plate of claim 3 wherein said aluminum-base dispersion fuel comprises $U_3O_8$–Al and said filler portion comprises aluminum and alpha-phase $Al_2O_3$.

5. The fuel plate of claim 4 wherein said alpha-phase $Al_2O_3$ is present in a concentration of about 17.2 weight percent in said filler portion.

References Cited

UNITED STATES PATENTS

| | | | |
|---|---|---|---|
| 3,334,997 | 8/1967 | Caillat | 176—91 R X |
| 3,350,274 | 10/1967 | Higatsberger | 176—91 X |
| 3,175,955 | 3/1965 | Cheverton | 176—75 X |
| 3,198,856 | 8/1965 | Hammond et al. | 176—75 |

FOREIGN PATENTS

| | | | |
|---|---|---|---|
| 1,810,142 | 11/1967 | Germany | 176—91 |

CARL D. QUARFORTH, Primary Examiner

G. G. SOLYST, Assistant Examiner

U.S. Cl. X.R.

176—75, 91, 93 BP